United States Patent [19]

Lautzenhiser et al.

[11] Patent Number: 4,955,232
[45] Date of Patent: Sep. 11, 1990

[54] FLOATED GRAVITY GRADIOMETER AND METHOD

[75] Inventors: Theodore V. Lautzenhiser, Tulsa, Okla.; Melvin Eisner, Houston, Tex.

[73] Assignee: Amoco Corporation, Chicago, Ill.

[21] Appl. No.: 359,454

[22] Filed: May 31, 1989

[51] Int. Cl.$^5$ ............................................. G01V 7/02
[52] U.S. Cl. .................................................. 73/382 G
[58] Field of Search ........................... 73/382 G, 382 R

[56] References Cited

U.S. PATENT DOCUMENTS

| | | | |
|---|---|---|---|
| 3,630,086 | 12/1971 | Wilk | 73/382 G |
| 3,668,932 | 6/1972 | Hansen | 73/382 G |
| 3,926,054 | 12/1975 | Buck | 73/382 G |
| 4,513,618 | 4/1985 | Lautzenhiser | 73/382 G |
| 4,581,932 | 4/1986 | Lautzenhiser et al. | 73/382 G |

OTHER PUBLICATIONS

C. Huai-ning, "An Investigation of Microweighing with an Eddy Current Transducer," *Rev. Sci. Instrum.*, 59, Oct. 1988, pp. 2297–2299.

*Primary Examiner*—John Chapman
*Attorney, Agent, or Firm*—Timothy D. Stanley; Marcy M. Lyles; Reginald K. Taylor

[57] ABSTRACT

An apparatus and method for measuring the vertical gradient of the vertical gravitational field using a gravity gradiometer comprising a housing containing a fluid, a float buoyantly supported within the fluid, mechanism for varying the metacentric height of the float, and apparatus for obtaining a measure of the gravitational gradient acting on the float resulting from varying the metacentric height.

6 Claims, 6 Drawing Sheets

FLOATED GRAVITY GRADIOMETER AND METHOD

FIELD OF THE INVENTION

The invention relates to measuring the gravitational field. More specifically, the invention relates to an apparatus and method for measuring the vertical gradient of the vertical gravitational field using a floated gradiometer in the air, on the surface, or in a wellbore.

BACKGROUND OF THE INVENTION

Gravity gradient measurements can be useful to a geophysicist in prospecting for oil and gas and other minerals. It is well known that various subsurface structures are indicative of mineral deposits, oil, gas, and the like, and that small variations in the gravitational field (gravity gradient) may indicate the presence of subsurface structures.

The relationship between the density of the subsurface structure and the earth's gravitational field can be illustrated by the following formula:

$$d = \frac{F}{4\pi G} - \frac{\partial g(z)/\partial z}{4\pi G} \quad (1)$$

where d is the density of a layer being determined, F is the free air gradient, G is the universal gravitational constant, and $\partial g(z)/\partial z$ is the vertical gradient of the earth's vertical gravitational field within the layer.

In the past, various instruments and methods have been developed to measure the vertical gradient of the earth's vertical gravitational field and/or gradients thereof. One prior art method for determining the vertical gravity gradient for well logging purposes requires that a detailed gravity survey be used wherein gravitational field measurements are made at two depths. This is followed by a calculation to generate the gradient. This method of determining the gravity gradient is time consuming and is incompatible with the continuous well logging practices.

The following patents disclose various other prior art methods and apparatus for determining the vertical gravity gradient: U.S. Pat. Nos. 3,630,086; U.S. 3,668,932; and 3,926,054.

Another method for determining the vertical gradient of the gravitational fields is described in U.S. Pat. No. 4,513,618. In this method, the vertical gradient of the vertical gravitational field is determined by producing a signal representative of the vertical gradient only of the vertical gravitational field. This signal is produced by a floating gradiometer in response to the vertical gravitational field. The gradiometer comprises a housing containing a fluid and a float means suspended in the fluid, said float means being the particular component of the apparatus that responds to the vertical gravitational field.

In a floated gradiometer, the forces acting on the float can be described by the following mathematical formula:

$$W = M\Delta z \frac{\partial g(z)}{\partial z} + E(T) \quad (2)$$

where W is the net force on the float, where M is the mass of the float, where $\Delta z$ is the difference in position of the center of buoyancy and the center of mass, and where $\partial g(z)/\partial z$ is the vertical gradient of the vertical gravity. E(T) is proportional to the difference in the mass of the float and the mass of the displaced fluid times the gravitational acceleration.

In equation 2, the net force on the float is dependent upon two terms. The first term is proportional to the difference in position of a center of buoyancy and the center of mass times the vertical gravity gradient. The second term, which is related to the gravity acceleration force, is proportional to the difference in the mass of the float and the mass of the displaced fluid times the gravitational acceleration.

In the past, in attempting to determine the gravity gradient force, the gravity acceleration force was reduced by carefully adjusting the density of the fluid by varying the temperature and the fluid composition. This balancing is very tedious and exacting and has not been accomplished stably enough for a field instrument.

There is a need for a method of determining the vertical gravity gradient that is compatible with continuous well logging practice and is stable enough for use as a field instrument.

SUMMARY OF INVENTION

The present invention involves an apparatus and method for measuring the vertical gradient of the vertical gravitational field using a floated gradiometer. The apparatus comprises a housing containing a fluid, a float buoyantly supported within the fluid, means for varying the metacentric height of the float, and means for obtaining a measure of the gravitational gradient acting on the float resulting from varying the metacentric height. The means for varying the metacentric height of the float can comprise a timing circuit and a motor to position a movable mass contained within the float by turning a screw while the mass rides along a traveling nut. The means for obtaining a measure of the gravitational gradient can comprise a means for sensing the position of the float and a means for restoring the float to its center null position. The means for sensing the position of the float can be capacitive, inductive, or interferometric means. The means for restoring the float to its center null position can be capacitive, magnetic, eddy current magnetic, or electromagnetic.

DETAILED DESCRIPTION OF THE DRAWINGS

Figure 1:
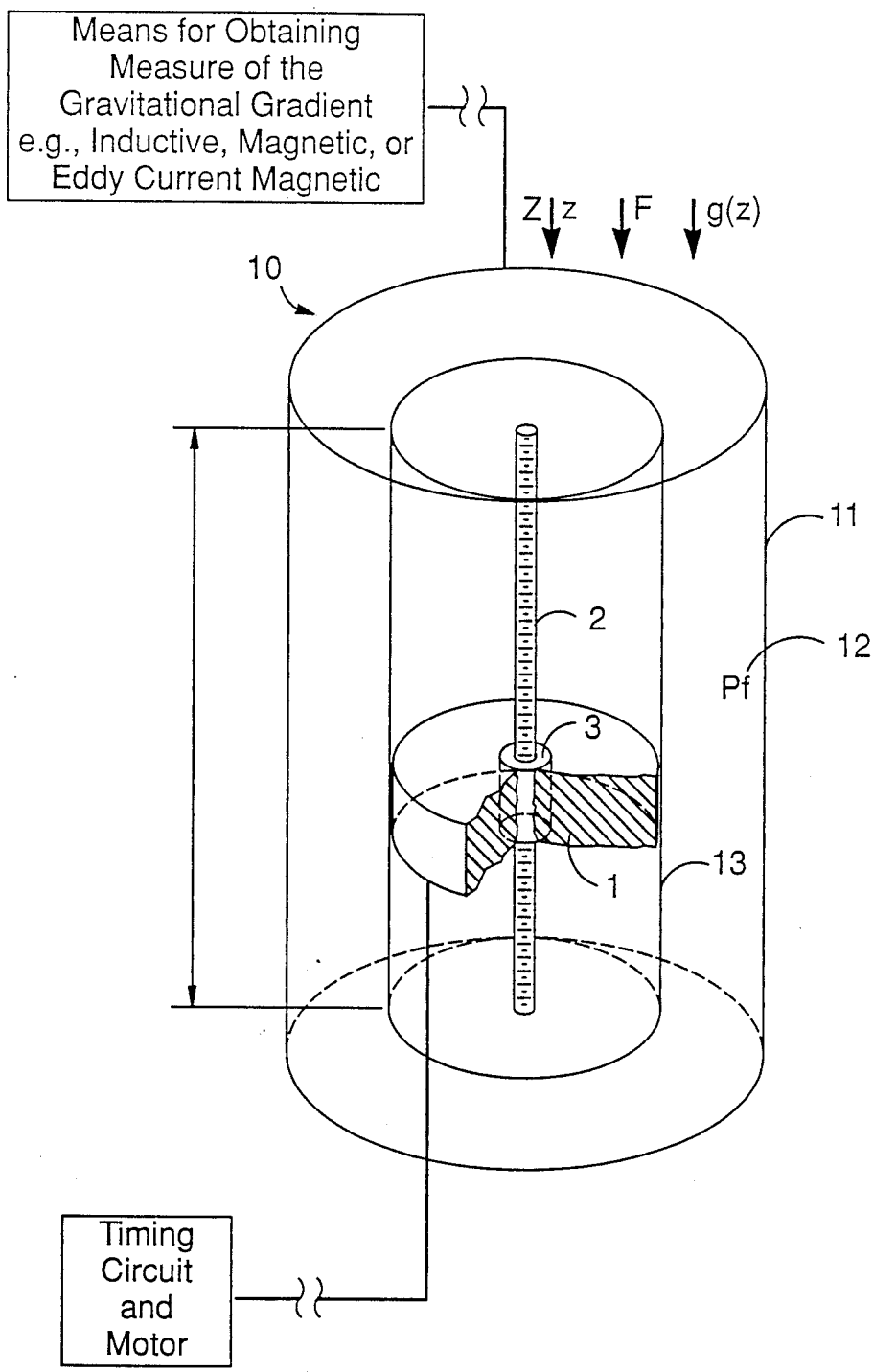
FIG. 1 illustrates diagrammatically certain principals of the invention.

Referring now to FIG. 1, reference numeral 10 refers to a floated gradiometer in accordance with the invention simplified to illustrate certain principals of the invention. Floated gradiometer 10 comprising housing 11 in the illustrated embodiment, an enclosed circular cylinder having a vertical axis z containing a fluid 12 having density $p_f$. Suspended in the fluid 12 is a float 13 having a moveable mass 1, said moveable mass 1 being capable of movement in the z direction by turning a screw 2 while the mass 1 rides on a traveling nut 3. The mass of the float 13 is supported against the forces of gravity and acceleration by its buoyancy in a thin layer of the fluid 12 between the float 13 and the housing 11. The float 13 is such that the weight of the float 13 is nearly exactly supported by its buoyancy, that is, for a right circular cylindrical float of the illustrated embodiment:

$$W = A \int_T^B p(z)g(z)dz \tag{3}$$

where W is the weight of the float 13, A is the cross sectional area, p(Z) is the density of the float 13 along the axis z, g(z) is a gravitational attraction on the float 13 along axis z when the axis z is aligned with the vertical z, the integral is taken from the top T to the bottom B of the float 13. The float is preferably balanced so that the float 13 is centered longitudinally for example with respect to the housing 11.

Variations in the vertical gradient of the vertical gravitational field produces a force F tending to displace the float 13 along the vertical axis z.

The force F tending to vertically displaced float 13 can be measured by various methods. The preferred method is applying an electrostatic force to the float 13 and measuring the field strength necessary to maintain the float 13 in a centered position with respect to the fluid 12 while the mass 1 of the float 13 is raised to the center of the float 13 for a period of time and then lowered to the bottom of the float 13 for a period of time which can be equal to the period of time the float was raised. A suitable material for the mass 1 is a non-ferromagnetic material such as, for example, tantalum or gold.

Figure 2:
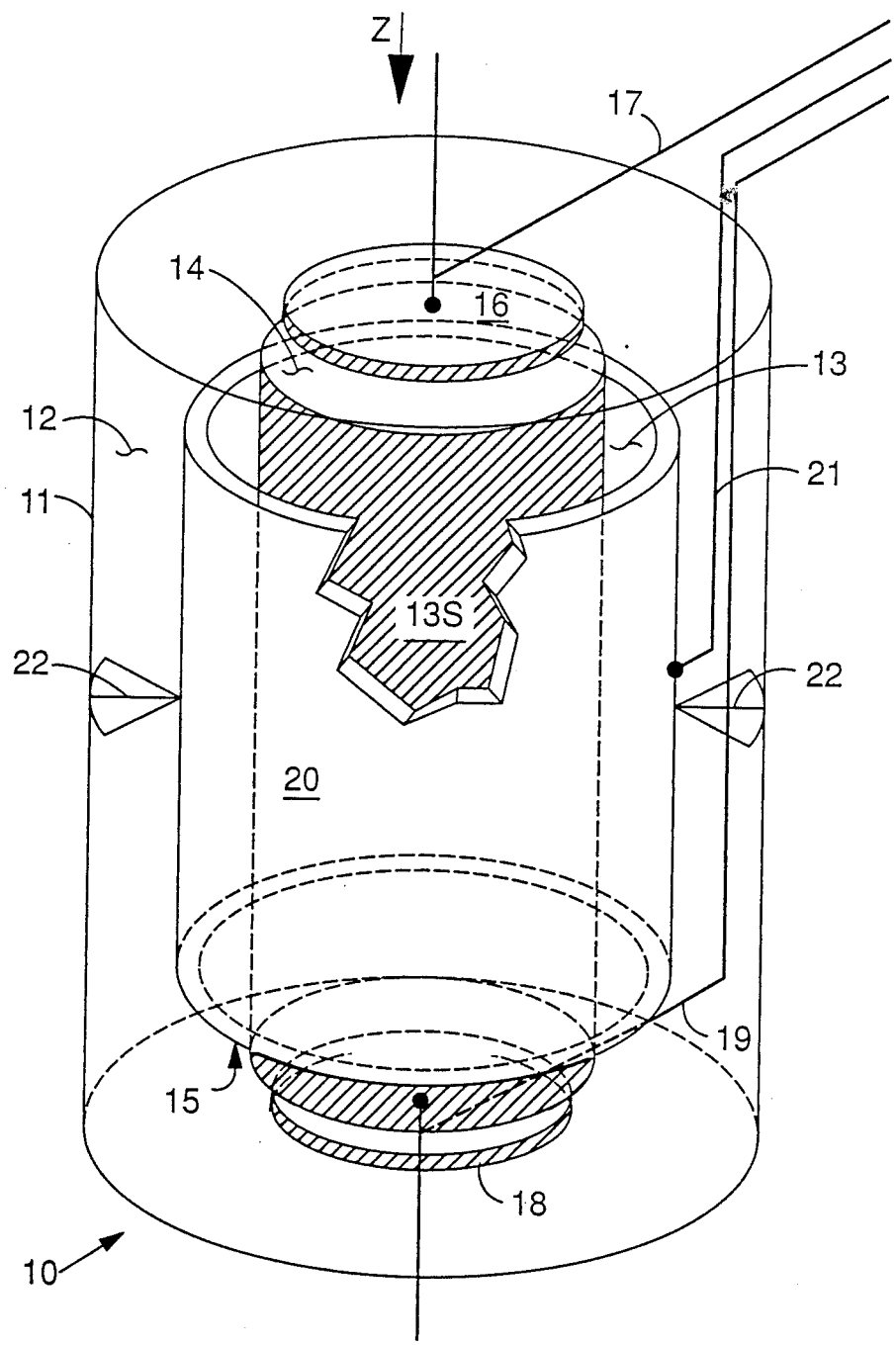
FIG. 2 illustrates in perspective a device for measuring the vertical gradient of the vertical gravitational field in accordance with the invention.

FIG. 2 represents an embodiment of a floated gradiometer in accordance with the invention. Housing 11 has a vertical axis z and contains fluid 12, float 13, moveable mass 1, screw 2, and travelling nut 3 as illustrated in FIG. 1. Float 13 is preferably a generally hollow right circular cylinder made of a dimensionally stable, non-ferromagnetic material having an electrically conductive material at least on the surface thereof. Suitable for use in the float 13 in accordance with this invention are non-ferromagnetic cements (semisynthetic products consisting of a mixture of ceramic and metallic components). Suitable for use in the float 13 as the electrically conductive material can be gold, silver, and the like which are sufficiently malleable to accommodate temperature variations. Preferably, float 13 has a substantially planar first upper end surface or plate 14 and a substantially planar lower end surface or plate 15.

The moveable mass 1 rides on a traveling nut 3 that is slideably connected to a screw 2. The mass can be raised to the center of the float or lowered to the bottom of the float by a timing circuit (not shown) and battery operated DC motor (not shown). The means for periodically raising and lowering the mass is not limited to this particular embodiment. One such means suitable for use in accordance with this invention is a mechanical centering mechanism and including a conductive means.

By raising the movable mass 1 up and down the difference in position of the center of buoyancy and the center of mass of the float 13 (i.e., the metacentric height of the float 13 can vary as function of time) is time modulated in a roughly square wave manner. Since, according to equation (2) the gravity gradient force is proportional to the difference in the position of the center of buoyancy and the center of mass, it will have a similar time dependency. On the other hand, as shown in equation (2), the gravity acceleration force is not a function of the difference between the center of mass and buoyancy of the float. Therefore, unlike the gradient gravitational force, the gravity acceleration force will not have a similar time dependency. Consequently, when the difference between the center of mass of the float and the center of buoyance of the float changes periodically, there is achieved a separation in time response of the gravity gradient force and the gravity acceleration force. By performing a phase detection of the signal, the gradient force can be directly determined.

Adjacent and spaced apart from the lower end plate 15 is a substantially circular second lower end plate 18 having electrical lead 19. Adjacent and spaced apart from the radial surface 13S of the float 13 is a generally cylindrical radial plate 20 having lead 21 and supported in housing 11 by supports 22. Preferably, plate 16 and 18 have diameters slightly less than the diameter of float 13 so that the edge effect will facilitate centering of the float 13 and housing 11 relative to plate 16 and 18. The length of the float 13 is preferably slightly longer than the length of the radial plate 20 so that the capacitance developed between radial surface 13S of float 13 and radial plate 20 remain substantially constant with small variations in the position of the float 13 and to minimize the tendency of the electrostatic force developed between float 13 and radial plate 20 to displace float 13 vertically. Preferably the weight of float 13 is adjusted as indicated so that the float 13 is about centered longitudinally with respect to radial plate 20. Alternately, float 13 can be, for example, electrostatically forced to achieve a longitudinally centered null position. All of the plates 16, 18, and 20 are made of, or at least possess, a surface made of an electrically conductive material. Preferably all the elements 13, 16, 18, and 20 are coaxial with the vertical axis z of housing 11.

First upper end plate 14 and second upper end plate 16 form a first capacitive element C1. First lower end plate 15 and second lower end plate 18 form a second capacitive element C2. Radial surface 13S and radial plate 20 form a third capacitance element C3.

As indicated in further detail below, a change in the vertical component of the vertical gravitational field will cause a change in the vertical force acting on the float 13. When axis z of cylinder 11 is aligned with the vertical gravitational field, the force developed will tend to displace the float 13 from its centered null position toward one or another of the second upper end plate 16 or second lower end plate 18 causing a change in capacitive elements C1 and C2 so that C1 and C2 can be modeled as variable capacitive elements varying responsive to the vertical gradient of the vertical gravity field.

Figure 3:
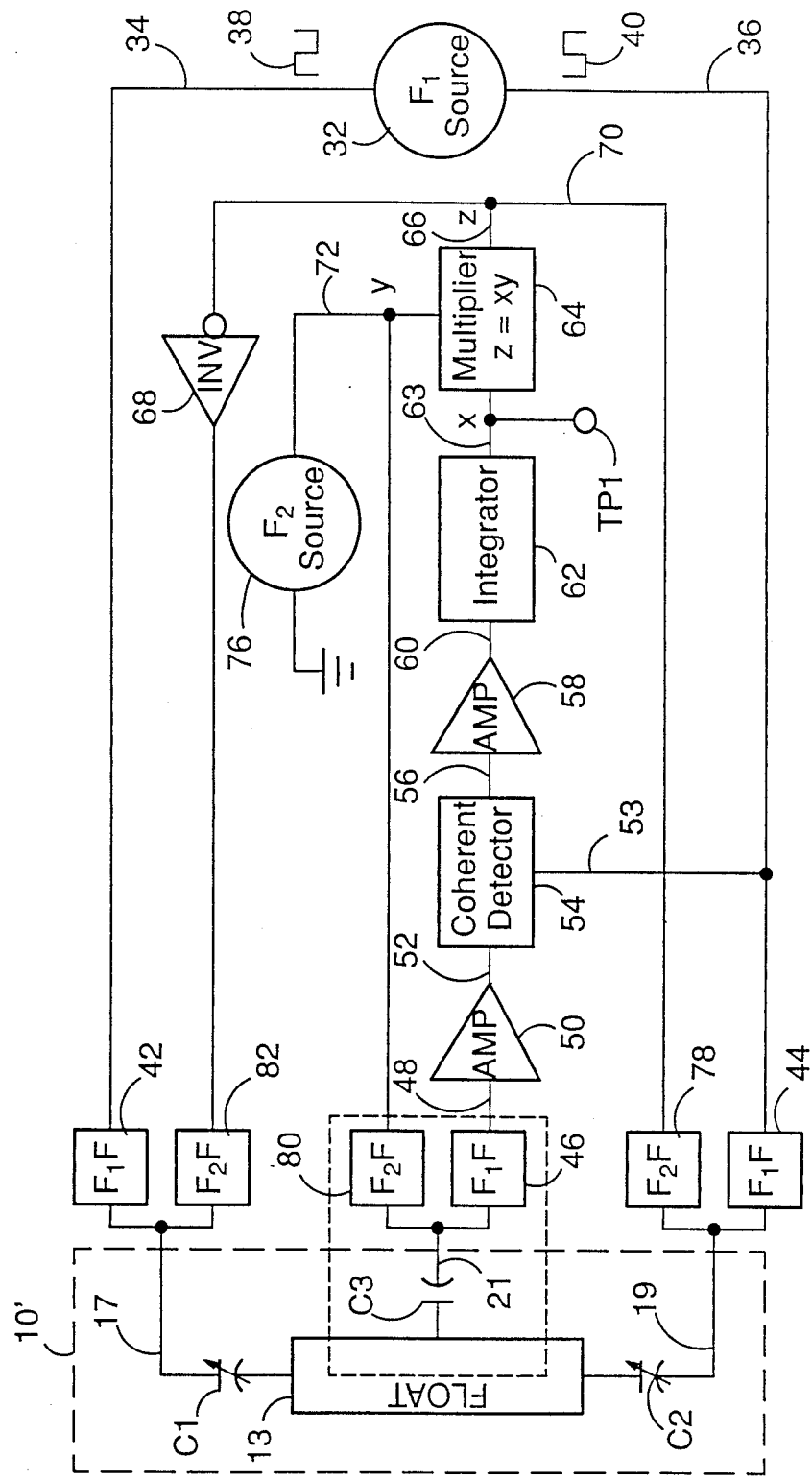
FIG. 3 illustrates schematically apparatus and method for measuring the vertical gradient of the vertical gravitational field in accordance with the embodiment of FIG. 2.

FIG. 3 schematically illustrates apparatus and method in accordance with the invention utilizing device 10' for measuring the vertical gradient with the vertical gravity field. Device 10' comprise first variable capacitive element C1 with electrical lead 17, second variable capacitive element C2 with electrical lead 19 and third capacitive element C3 with electrical lead 21. Float 13 having at least a surface made of an electrical conductive material completes the circuit so that one plate of each C1, C2, and C3 are effectively electrically common.

In the illustrated embodiment of FIG. 3, a first frequency F1 is employed for sensing the position of the float 13 while a second frequency F2 is employed for forcing the float back to its centered null position. Referring again to FIG. 3, Reference 32 indicates the F1 source, for example a square wave generator having a frequency of 30 kHz, having two outputs 34 and 36 which are equal in amplitude and 180° out of phase as illustrated by wave forms 38 and 40, respectively. One output of source 32 is applied to variable capacitance C1 through F1 filter 42 and other output, 180° out of phase, is applied to variable capacitance C2 through F1 filter 44.

The F1 signals thus applied to C1 and C2 are summed on radial plate 20 of float 13 shown in FIG. 2 and referring again to FIG. 3 are coupled via capacitance C3, lead 21, F1 filter 46, and lead 48 to amplifier 50. The amplifier 50 output is electrically connected by lead 52 to coherent detector 54. Coherent detector 54 also requires and input from source 32 in the illustrated embodiment via leads 36 and 53. Coherent detector 54 is functional for comparing the signals on lead 52 and lead 53, and for producing an output signal on lead 56 which is representative of the voltage difference between the two signals by demodulating the capacitor plates 20 signal and producing a direct current DC voltage signal whose polarity and magnitude are determined by the direction and magnitude, respectively of the displacement of the float. Coherent detectors capable of performing such functions are well known and need not be further described.

The signal on lead 56 is representative of the position of float 13 and further is employed to generate a signal for returning float 13 to its centered null position. In the illustrated embodiment, the output signal of coherent detector 54 is amplified by amplifier 58 and the output at line 60 is provided to lead-lag filter 62 which functions to prevent feedback loop oscillation and to generate a signal used to generate the force signal for returning float 13 to its centered null position.

The output of lead-lag filter 62 is proportional to the vertical gradient component of the vertical gravitational field and a signal representative of the vertical component of the vertical gravitational field can be taken off at that point, for example, as illustrated at TP1. The output of lead-lag filter 62 is provided as one input via lead 63 to a multiplier 64. F2 square wave generator 76 provides a second input to multiplier 64 via lead 72.

Figure 4:
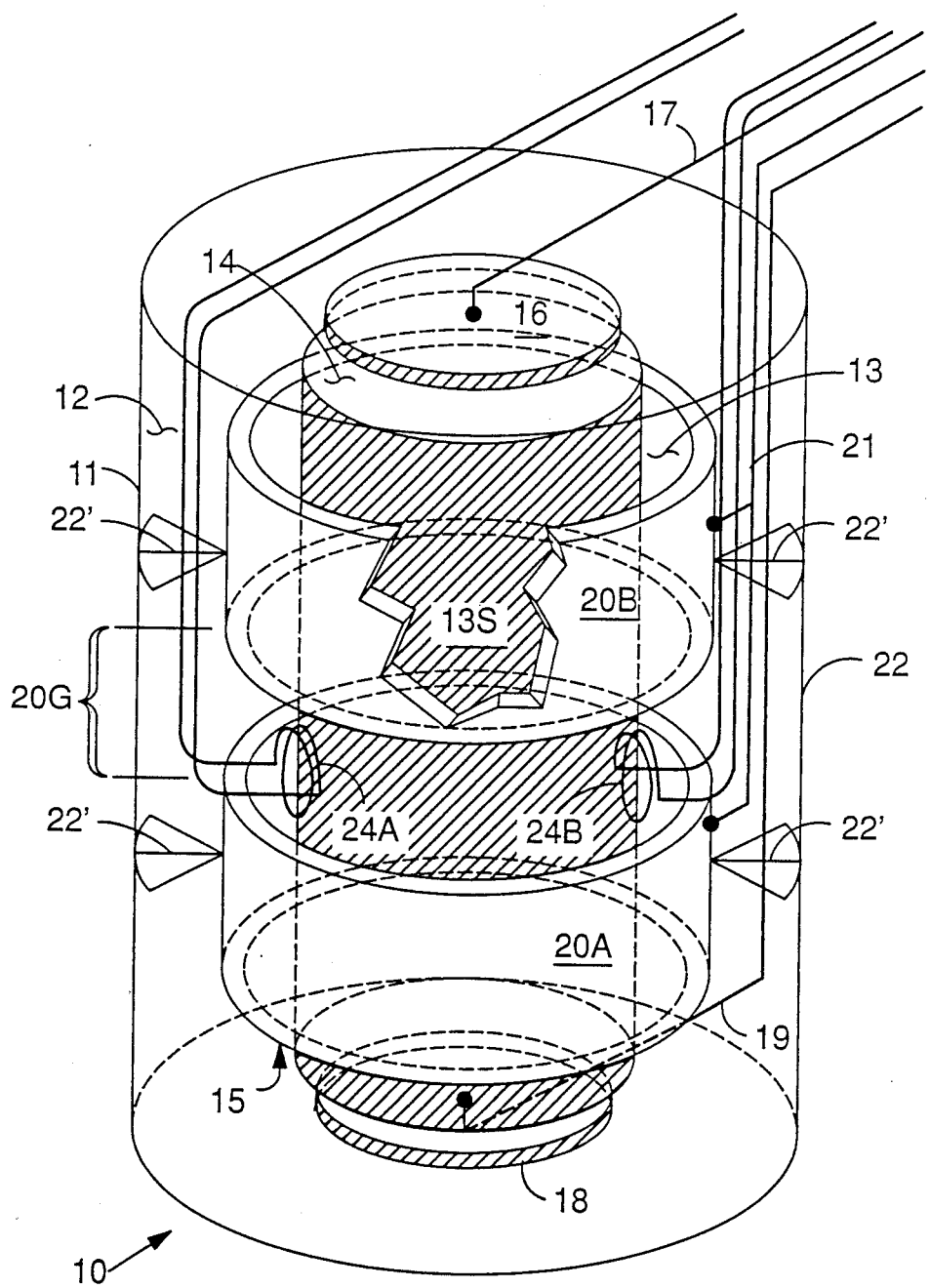
FIG. 4 illustrates in perspective a device for measuring the vertical gradient of the vertical gravitational field in accordance with a preferred embodiment of the invention.

When float 13 at its centered null position is equidistantly spaced from each of plates 16 and 18, (shown in FIG. 2) the output signal from coherent detector 54 will be zero. When a change in the vertical component of the vertical gravity field produces a vertical displacement in float 13, the output of coherent detector 54 will be as indicated a DC voltage whose polarity and magnitude are determined by the displacement of float 13. The output of lead-lag filter is provided to multiplier 64 as the X signal and an output of F2 source 76 having a frequency, for example 1 kHz, is provided to multiplier 64 as the y signal. The product signal z=xy of multiplier 64 is provided by lead 66 and inverter 68 to F2 filter 82 and lead 17 to first capacitive element C1 and is also provided by lead 70, F2 filter 78 and lead 19 to second capacitive element C2. The output of F2 source 76 is also provided by F2 filter 80 and lead 21 to third capacitive element C3. By this arrangement, a restoring force is applied to the capacitive elements to return float 13 to the centered null position. FIG. 4 represents a preferred embodiment of the device in accordance with the invention. Generally, FIG. 4 corresponds to FIG. 2 and numbering for reference purposes similarly corresponds. In FIG. 4, however, plate 20 is represented by two cylindrical plates 20A and 20B which are, for example, externally electrically connected, having a gap 20G therebetween adjacent the central portion of float 13. Adjacent float 13 and gap 20G are, for example, coil 24A, 24B, and 24C (not shown) preferably, equidistantly spaced apart which are functional for maintaining float 13 vertically coaxial with respect to the vertical axis z. In the illustrated embodiment, coils 24A, 24B, and 24C are oriented with open ends of the coils adjacent float 13.

Figure 5:
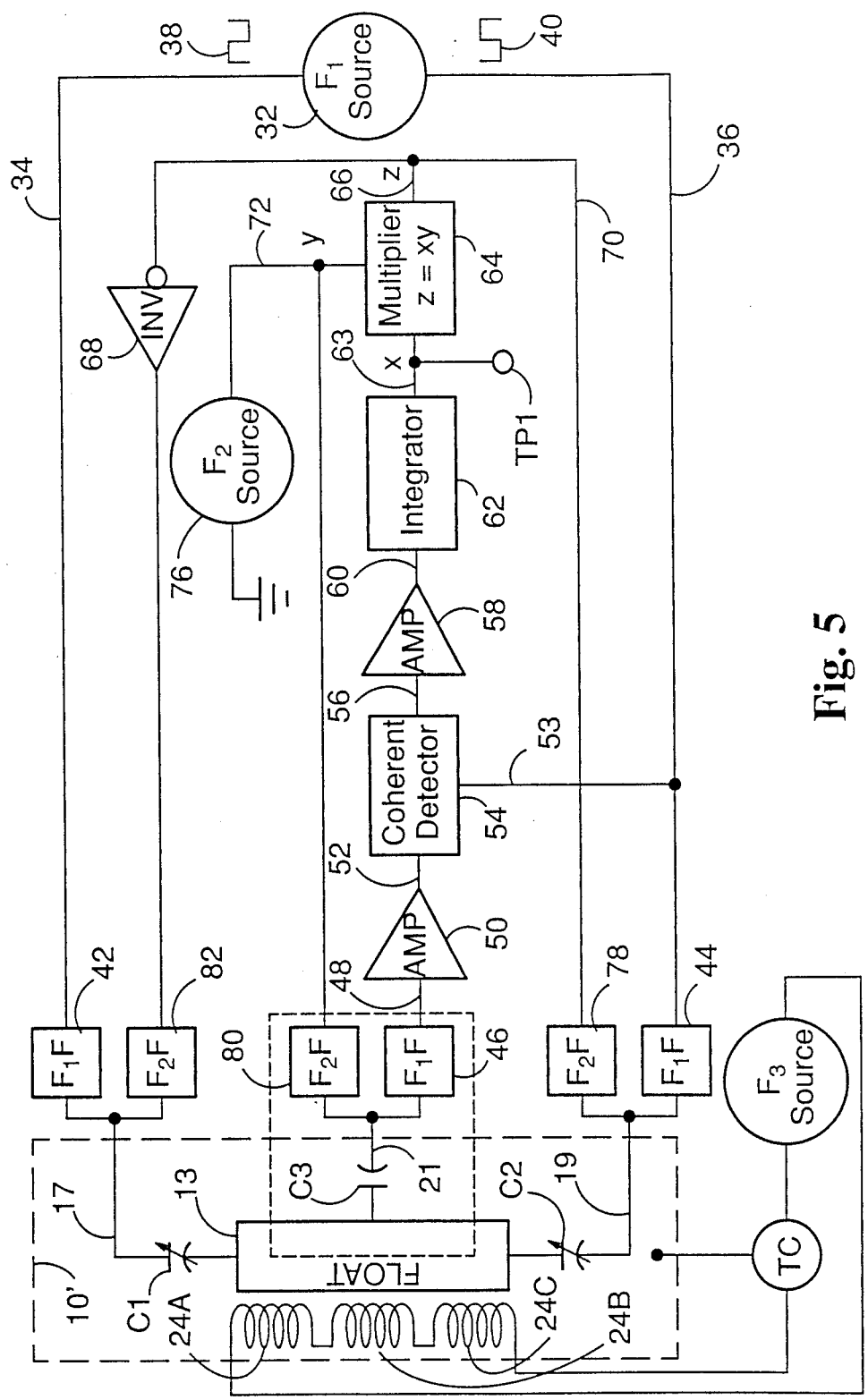
FIG. 5 illustrates schematically apparatus and method for measuring the vertical gradient of the vertical gravitational field in accordance with the embodiment of FIG. 4.

Referring now to FIG. 5. FIG. 5 represents schematically apparatus for measuring the vertical gradient of the vertical gravitational field in accordance with embodiment of FIG. 4. FIG. 5 corresponds to FIG. 3 except for the presence of coils 24A, 24B, and 24C connected in series to oscillator F3 having a frequency, for example, of 1 mHz and having a magnitude controlled by temperature controller TC having a sensor with the device housing. The electromagnetic field induced in the equally spaced coils 24A, 24B, and 24C by F3 source causes the float to be coaxial to the vertical axis of the device 10 and eddy currents induced in the conductive surfaces can be utilized for temperature control.

Although the invention has been described as required in terms of preferred embodiments, it is apparent to those skilled in the art that other apparatus and methods are possible without departing from the principles of the invention. Thus, for example, although sensing the position of the float 13 and restoring the float 13 to its center null position has been herein above described with reference to capacitive sensing and forcing, it will be apparent that many other ways of sensing and restoring can be employed, thus, for example, sensing may be accomplished interferometrically, inductively, and the like, and restoring can be accomplished magnetically, by eddy current magnetic effects, electromagnetically, and the like. As herein described, the invention is described in terms of a float 13 which is balanced at is centered null position at a zero gradient; however, for small deviations from a natural balance of zero gradients, the float 13 can be maintained at the null position.

Figure 6:
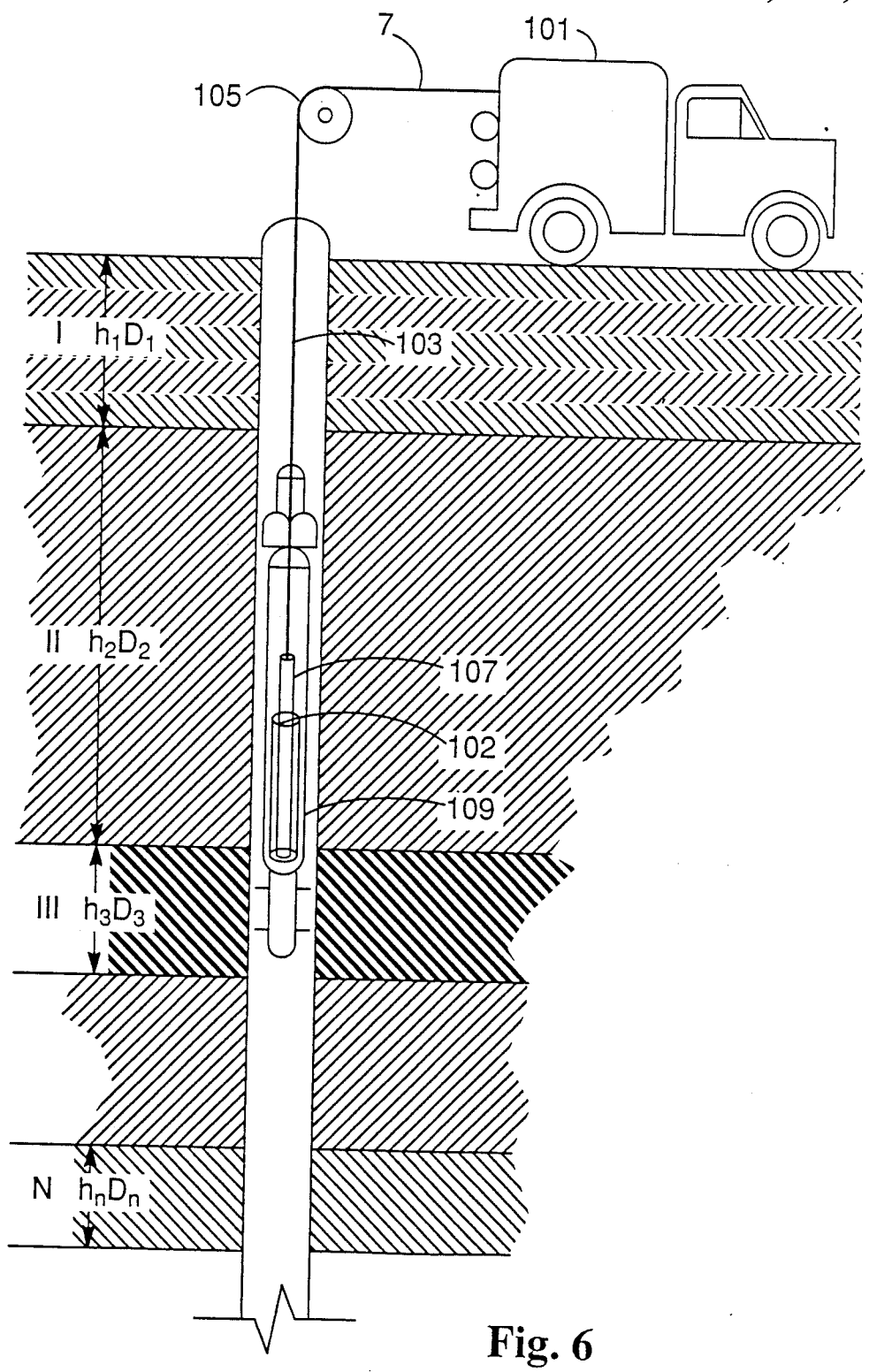
FIG. 6 illustrates schematically apparatus and method for oil and gas exploration in the vicinity of a borehole in accordance with the invention.

To further illustrate the invention, the use of the invention in oil and gas exploration in the vicinity of a borehole is illustrated in FIG. 6. Referring now in detail to FIG. 6, FIG. 6 depicts generally a method of oil and gas exploration utilizing the apparatus and method in accordance with the invention for oil and gas exploration in the context of a borehole. Referring now to FIG. 6 in detail, there is illustrated in schematic form apparatus for making measurements of the vertical gravitational field in a borehole in accordance with the invention. A conventional logging truck 101 at the earth's surface controls a gravity sonde 102 which is lowered into a borehole on a logging cable 103 over one or more sheaves 105 suspended over the borehole. The cable 103 may be a multiconductor cable such as is conventionally used for electrical well logging purposes and is functional for transmitting the signal from the sonde to the receiver, such as a recorder at the surface. The sonde 102 has apparatus 107 in accordance with the invention mounted therein, for example, by gimbal 109 to maintain the apparatus generally vertical and in alignment with the vertical component of the vertical gravitational field. The sonde 102 while being lowered through the borehole traverses a number of earth formations designated by I, II, III . . . N each of which has a different density designated by $D_1$, $D_2$, $D_3$ . . . $D_n$ with the thickness of the respected formations designated by $h_1$, $h_2$, $h_3$ . . . , $h_n$. If it is desired to determine the density $D_2$ of layer II for example, measurements of the vertical gradient of the vertical gravitational field can be taken in layer II, and the density of the layer can be determined from equation (1).

Since the vertical component of the gravity gradient is determined directly in accordance with the invention, only one measurement at one depth is required to determine the quantity, although for accuracy more than one may be taken. Potentially, gravity gradient determination using the invention may even eliminate the need to halt the sonde during measurements and permit a continuous log to be developed since the method and apparatus according to the invention are not inherently incompatible with continuous logging.

In addition to wellbores, the present invention can be used on the surface or airborne using well known techniques.

Although the invention has been described in terms of a specific preferred embodiment as required, the invention is not limited thereto but to apparatus and method as defined in the claims hereafter appended.

What is claimed:

1. A gravity gradiometer, comprising:
   a housing containing a fluid;
   a float buoyantly supported within the fluid;
   means for varying the metacentric height of the float; and
   means for obtaining a measure of the gravitational gradient acting on the float resulting from varying the metacentric height.

2. Apparatus of claim 1 wherein the means for varying the metacentric height of the float comprises a timing circuit and a motor for positioning a movable mass contained within the float by turning a screw while the mass rides on a traveling nut.

3. An apparatus of claim 2 wherein the means for obtaining a measure of the gravitational gradient comprises capacitive means for sensing the position of the float and restoring the float to its center null position.

4. An apparatus of claim 1 wherein the means for obtaining a measure of the gravitational gradient comprises a inductive means for sensing the position of the float and a magnetic means for restoring the float to its center null position.

5. An apparatus of claim 2 wherein the means for obtaining a measure of the gravitational gradient comprises an inductive means for sensing the position of the float and an eddy current magnetic means for restoring the float to its center null position.

6. A method for measuring the vertical gradient of the vertical gravitational field using the floated gradiometer having a housing containing a fluid and a float buoyantly supported within the fluid, comprising the steps of:
   (a) varying the metacentric height of the float; and
   (b) measuring the gravitational gradient acting on the float resulting from varying the metacentric height.

* * * * *

UNITED STATES PATENT AND TRADEMARK OFFICE
CERTIFICATE OF CORRECTION

PATENT NO. : 4,955,232

DATED : September 11, 1990

INVENTOR(S) : THEODORE V. LAUTZENHISER

It is certified that error appears in the above--identified patent and that said Letters Patent is hereby corrected as shown below:

COLUMN 8, LINE 21;
Claim 4, line 1, "Claim 1" should read --Claim 2--.

Signed and Sealed this

Thirty-first Day of March, 1992

Attest:

HARRY F. MANBECK, JR.

*Attesting Officer*  *Commissioner of Patents and Trademarks*